United States Patent
Hsu (10) Patent No.: US 11,985,249 B2
(45) Date of Patent: May 14, 2024

(54) BLOCKCHAIN CREATION METHOD, COMPUTING DEVICE, AND STORAGE MEDIUM

(71) Applicant: HON HAI PRECISION INDUSTRY CO., LTD., New Taipei (TW)

(72) Inventor: Kai-Ti Hsu, New Taipei (TW)

(73) Assignee: HON HAI PRECISION INDUSTRY CO., LTD., New Taipei (TW)

(\*) Notice: Subject to any disclaimer, the term of this patent is extended or adjusted under 35 U.S.C. 154(b) by 280 days.

(21) Appl. No.: 17/530,682

(22) Filed: Nov. 19, 2021

(65) Prior Publication Data
US 2022/0209957 A1 Jun. 30, 2022

(30) Foreign Application Priority Data
Dec. 28, 2020 (CN) .......................... 202011583278

(51) Int. Cl.
H04L 9/32 (2006.01)
G06F 16/13 (2019.01)
G06Q 20/38 (2012.01)
H04L 9/00 (2022.01)

(52) U.S. Cl.
CPC .......... *H04L 9/3239* (2013.01); *G06F 16/134* (2019.01); *G06Q 20/3823* (2013.01); *H04L 9/3265* (2013.01); *H04L 9/50* (2022.05); *H04L 2209/56* (2013.01)

(58) Field of Classification Search
CPC ....... H04L 9/3239; H04L 9/3265; H04L 9/50; H04L 2209/56; H04L 67/1042; G06F 16/134; G06F 16/1834; G06F 21/64; G06F 16/27; G06Q 20/3823
See application file for complete search history.

(56) References Cited

U.S. PATENT DOCUMENTS

| | | | |
|---|---|---|---|
| 11,075,891 B1\* | 7/2021 | Long | H04L 9/3213 |
| 2019/0306190 A1\* | 10/2019 | Suraparaju | G06F 21/602 |
| 2019/0349426 A1\* | 11/2019 | Smith | G06F 16/1824 |
| 2020/0043007 A1\* | 2/2020 | Simons | G06Q 20/08 |
| 2020/0266989 A1\* | 8/2020 | Krcmaricic-Barackov | H04L 9/30 |
| 2020/0396065 A1\* | 12/2020 | Gutierrez-Sheris | H04L 63/12 |
| 2021/0006972 A1\* | 1/2021 | Guim Bernat | H04L 9/3239 |
| 2021/0037076 A1\* | 2/2021 | Long | G06Q 20/36 |
| 2021/0119778 A1\* | 4/2021 | Cheng | H04L 9/3247 |
| 2022/0038289 A1\* | 2/2022 | Huang | G06F 16/27 |

\* cited by examiner

*Primary Examiner* — John B King
(74) *Attorney, Agent, or Firm* — ScienBiziP, P.C.

(57) ABSTRACT

A blockchain creation method and a computing device are disclosed, the method obtains a plurality of first edge computing nodes at a preset first distance from the cloud center, and creates a main chain based on the cloud center and the plurality of first edge computing nodes. At least one first edge computing node is selected from the plurality of first edge computing nodes as a shared edge computing node, and a plurality of second edge computing nodes at a preset second distance are obtained from the shared edge computing node, then creating at least one side chain based on the shared edge computing node and the plurality of second edge computing nodes. A block generated in the at least one side chain is written into the main chain. Data synchronization and security during transmission in the distributed system can be ensured.

20 Claims, 5 Drawing Sheets

---

101 — Obtaining a plurality of first edge computing nodes at a preset first distance from a cloud center, and creating a main chain based on the cloud center and the plurality of first edge computing nodes 102 — Selecting at least one first edge computing node from the plurality of first edge computing nodes as a shared edge computing node, and obtaining a plurality of second edge computing nodes at a preset second distance from the shared edge computing node, then creating at least one side chain based on the shared edge computing node and the plurality of second edge computing nodes 103 — Writing a block generated in the at least one side chain into the main chain

BLOCKCHAIN CREATION METHOD, COMPUTING DEVICE, AND STORAGE MEDIUM

FIELD

The present disclosure relates to a technical field of blockchains, specifically a blockchain creation method, a computing device and a storage medium.

BACKGROUND

Edge computing is the current tendency in network services or communication services, but the data of edge computing nodes is not synchronized with the cloud center, there is the risk of data being lost, or at least difficult to trace. Data may also be lost or stolen during data transmission.

A decentralized blockchain network increases data security and stores data in different blockchain nodes in many locations to avoid data loss.

Creating a blockchain network based on edge computing nodes in a distributed system is problematic.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the blockchain creation method of the present disclosure is applied to one or more computing devices. The computing device includes hardware such as, but not limited to, a microprocessor and an Application Specific Integrated Circuit (ASIC), Field-Programmable Gate Array (FPGA), Digital Signal Processor (DSP), embedded devices, etc.

The computing device may be a device such as a desktop computer, a notebook, a palmtop computer, or a cloud server. The computing device can interact with users through a keyboard, a mouse, a remote control, a touch panel, or a voice control device.

Figure 1:
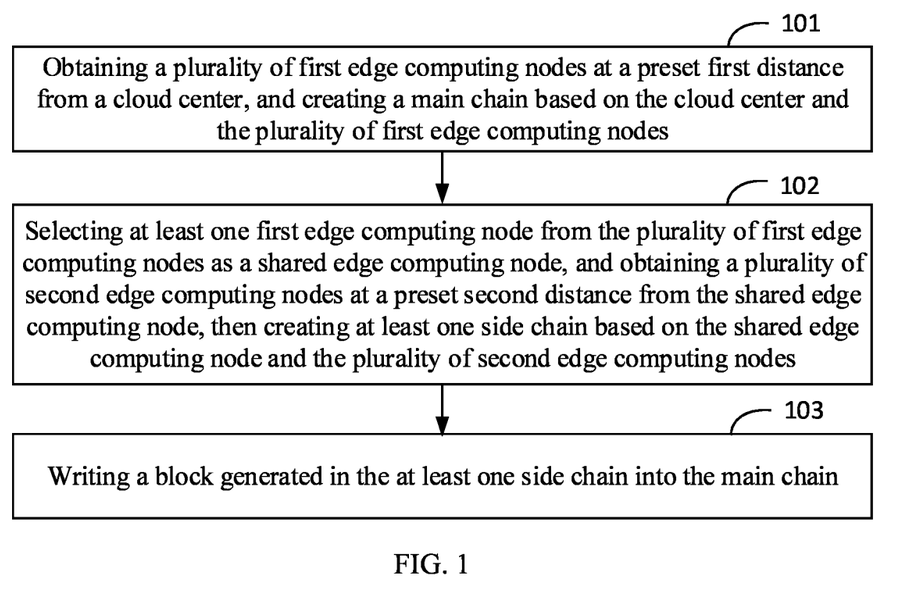
FIG. 1 shows a flowchart of a blockchain creation method provided in an embodiment of the present disclosure.

FIG. 1 is a flowchart of a blockchain creation method for data storage in an embodiment of the present disclosure. The blockchain creation method is applied to computing devices. According to different needs, the order of the steps in the flowchart can be changed, and some can be omitted.

In block 101, obtaining a plurality of first edge computing nodes at a preset first distance from a cloud center, and creating a main chain based on the cloud center and the plurality of first edge computing nodes.

A distance value between each edge computing node and the cloud center is obtained, and edge computing nodes whose distance value is less than or equal to the preset first distance are determined as the first edge computing nodes.

For example, assuming that a preset first distance is 2 km, and an obtained distance between the cloud center and a node A is 1 km, a distance between the cloud center and a node B is 2 km, and a distance between the cloud center and a node C is 3 km, then the node A and the node B are determined to be the first edge computing nodes.

In at least one embodiment, wherein creating a main chain based on the cloud center and the plurality of first edge computing nodes includes: generating a first genesis block through the cloud center; verifying the first genesis block through the plurality of first edge computing nodes; when a successful verification of the first genesis block is made, determining the first genesis block as a block header of the main chain, and controlling the cloud center and the plurality of first edge computing nodes to continue generating blocks.

Creating a blockchain network based on the cloud center and the plurality of first edge computing nodes enables the cloud center and the first edge computing nodes to communicate with each other. The blockchain (including the main chain) is created of a plurality of connected blocks. Each block records transactions over a period of time. The blocks can be regarded as pages in an account book. The first block to be created is called the genesis block and has an unique identification (ID). Except for the genesis block, each subsequent block has two IDs, one is the ID of the previous block and the other is the ID of the block itself. Through the front-to-back relationship between IDs, all blocks are connected in sequence to form a blockchain.

The first genesis block includes a time-of-creation timestamp of the first genesis block, an initial block hash, and initial core parameters.

In block 102, selecting at least one first edge computing node from the plurality of first edge computing nodes as a shared edge computing node, and obtaining a plurality of second edge computing nodes at a preset second distance from the shared edge computing node, then creating at least one side chain based on the shared edge computing node and the plurality of second edge computing nodes.

In at least one embodiment, wherein obtaining a plurality of second edge computing nodes at a preset second distance from the shared edge computing node includes: obtaining a preset minimum number of nodes as a threshold; searching for neighboring nodes of the shared edge computing node (hereinafter referred to as first neighboring nodes), determining the shared edge computing node and the first neighboring nodes as the second edge computing nodes; calculating a number of the second edge computing nodes; when the number is less than the preset threshold number, searching for neighboring nodes of the first neighboring nodes (hereinafter referred to as second neighboring nodes); determining the second neighboring nodes as the second edge computing nodes; when the number of the second edge computing nodes is equal to the preset threshold number, ceasing to search.

The first neighboring nodes refers to nodes closest to the shared edge computing node, and the second neighboring nodes refers to nodes closest to the first neighboring nodes.

In at least one embodiment, wherein creating at least one side chain based on the shared edge computing node and the plurality of second edge computing nodes includes: taking a block generated by the shared edge computing node as a second genesis block; verifying the second genesis block through the shared edge computing node and the plurality of second edge computing nodes; when a successful verification of the second genesis block is made, determining the second genesis block as a block header of the at least one side chain, and controlling the shared edge computing node and the plurality of second edge computing node to continue generating blocks.

The shared edge computing node connects the plurality of first edge computing nodes, the cloud center, and the plurality of second edge computing nodes.

In another embodiment, the main chain and the at least one side chain adopt a same consensus mechanism. The consensus mechanism includes a Delegated Proof-of-Stake (DPOS) mechanism, a Proof of Work (PoW) mechanism, etc. The consensus mechanism is used to verify a validity of a newly generated block. For example, the shared edge computing node and the plurality of second edge computing nodes are controlled to verify the second genesis block through the consensus mechanism.

In block 103, writing a block generated in the at least one side chain into the main chain.

In at least one embodiment, wherein writing a block generated in the at least one side chain into the main chain includes: determining whether the at least one side chain satisfies a preset condition; when the at least one side chain satisfies the preset condition, obtaining a first hash value of a last block of the at least one side chain, and obtaining a second hash value of a last block of the main chain; controlling the cloud center and the plurality of first edge computing nodes to generate a target block (a new block) on the main chain, and writing the first hash value and the second hash value into the target block, a hash value of the target block is equal to a combined value of the first hash value and the second hash value.

In at least one embodiment, wherein determining whether the at least one side chain satisfies a preset condition includes: calculating a total number of blocks generated in the at least one side chain; determining whether the total number is equal to a preset number threshold; when the total number is equal to the preset number threshold, determining that the at least one side chain satisfies the preset condition; when the total number is less than the preset number threshold, determining that the at least one side chain does not satisfy the preset condition.

In another embodiment, when the total number is greater than the preset number threshold, it is determined that the at least one side chain satisfies the preset condition.

In another embodiment, wherein determining whether the at least one side chain satisfies a preset condition includes: obtaining a first time point when the at least one side chain was written into the main chain last time, and obtaining a preset cycle and a current time point; according to the first time point and the preset cycle, determining a second time point when the at least one side chain is written to the main chain next time; when the current time point is equal to the second time point, determining that the at least one side chain satisfies the preset condition; when the current time point is not equal to the second time point, determining that the at least one side chain does not satisfy the preset conditions.

After a block generated in the at least one side chain is written into the main chain, the shared edge computing node and the plurality of second edge computing nodes are controlled to recreate a new side chain according to the main chain. This reduces the difficulty for the shared edge computing nodes and the plurality of second edge computing nodes in generating blocks in the new side chain.

The blockchain creation method of the present disclosure creates a blockchain composed of a side chain and a main chain, and improves efficiency of creating a blockchain. By treating the edge computing node as a blockchain node, and through appropriate grouping and side chain control, the edge computing node in the distributed system is made into a high-performance blockchain network to ensure data synchronization and security during transmission in the distributed system.

In at least one embodiment, the blockchain creation method further includes: receiving a first transaction request sent by a user terminal at a first location: determining a first target edge computing node closest to the first location: allocating the first transaction request to a first side chain where the first target edge computing node is located, and verifying a validity of the first transaction request through the first side chain. A first transaction block can be generated, and a first transaction block can be uploaded to the first side chain.

In at least one embodiment, after the first transaction block is generated, the blockchain creation method further includes: receiving a second transaction request sent by a user terminal at a second location; determining a second target edge computing node closest to the second location; allocating the second transaction request to a second side chain where the second target edge computing node is located; determining whether the first side chain and the second side chain have a common edge computing node; when it is determined that the first side chain and the second side chain have a common edge computing node, obtaining the first transaction block through the common edge computing node; generating a second transaction block through the first transaction block and uploading the second transaction block to the second side chain.

The first side chain and the second side chain have the common edge computing node. When the user terminal performs the first transaction through the first side chain in the first position, the common edge computing node can obtain transaction information of the first transaction. When the user terminal performs the second transaction through the second side chain at the second location, the second side chain can obtain the transaction information of the first transaction through the common edge computing node. By using the common edge computing node as a communication channel for transaction information, time consumption of transmissions of transaction information is reduced. The transaction information of the first transaction and the transaction information of the second transaction include ledger information of the user terminal.

In another embodiments, the first side chain or the second side chain can be replaced with the main chain. For example, the second side chain is replaced with the main chain. After the first transaction block is generated, the second transaction request from the user terminal at the second location is received, and the second target edge computing node closest to the second location is determined; the second transaction request is allocated to the main chain where the second target edge computing node is located. A determination is made as to whether the first side chain and the main chain have a common edge computing node, and if it is determined that the first side chain and the main chain have a common edge computing node, the first transaction block is obtained through the common edge computing node; a second transaction block is generated according to the first transaction block, and the second transaction block is uploaded to the main chain.

Figure 2:
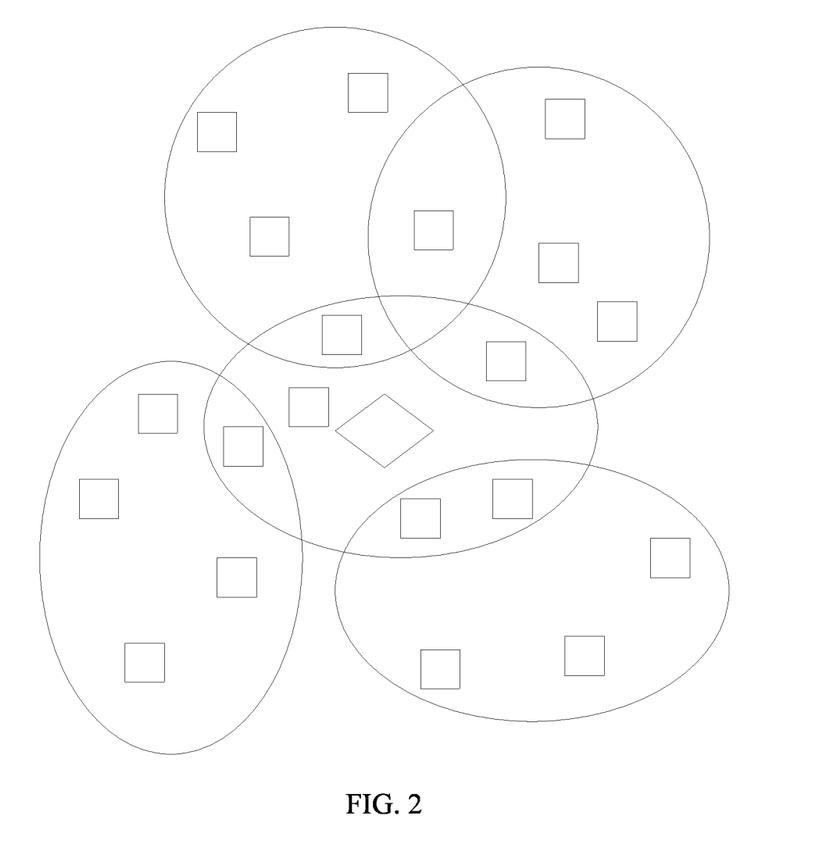
FIG. 2 shows a node group provided by an embodiment of the present disclosure.

FIG. 2 shows a node group provided by an embodiment of the present disclosure. A diamond-shaped block in the middle represents a cloud center, and a square block represents edge computing nodes. An ellipse including a diamond-shaped block represents a main chain node group composed of the cloud center and the plurality of first edge computing nodes, and an ellipse or a circle excluding the diamond-shaped block represents a side chain node group composed of the shared edge computing node and the plurality of first edge computing nodes. Edge computing nodes that exist in the main chain node group and the side chain node group at the same time are the shared edge computing nodes.

Figure 3:
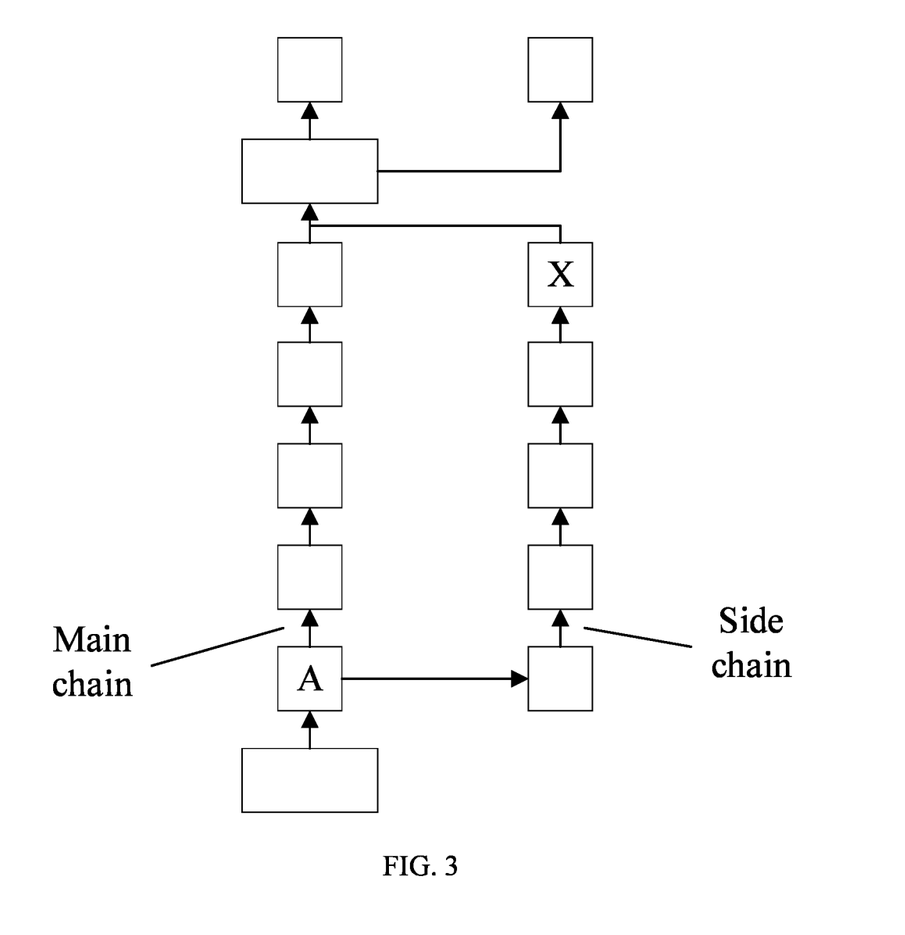
FIG. 3 is a schematic diagram of a block generated by a main chain and a side chain provided by an embodiment of the present disclosure.

FIG. 3 is a schematic diagram of a block generated by a main chain and a side chain provided by an embodiment of the present disclosure. After creating a main chain based on the main chain node group (a main chain created based on the cloud center and the plurality of first edge computing nodes), the side chain node group (a side chain created based on the shared edge computing node and the plurality of second edge computing nodes) is controlled to generate the first genesis block of the side chain from a block in the main chain. The side chain corresponds to a side chain node group, and the side chain node group continues to generate new blocks on the blockchain side chain. When the X block is generated, the blockchain side chain satisfies the preset conditions (for example, a length of the chain side reaches 5), by merging a hash value of the X block and a hash value of the corresponding block of the main chain, the information of the side chain is anchored to the main chain.

Figure 4:
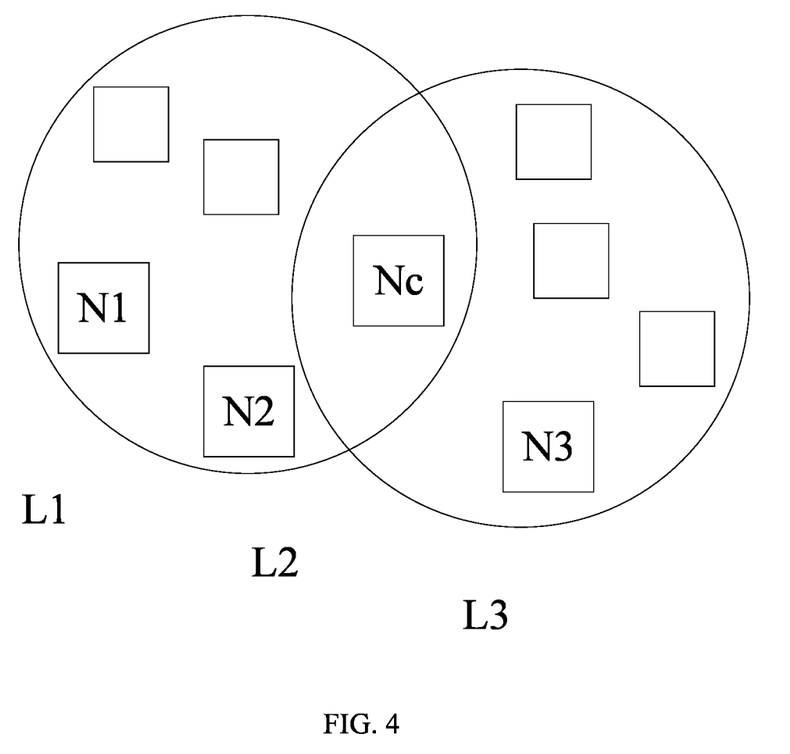
FIG. 4 shows the processing of a transaction according to locations of the transaction requester, provided by an embodiment of the present disclosure.

FIG. 4 shows the processing of a transaction according to locations of the transaction requester provided by an embodiment of the present disclosure. L1, L2, and L3 represent three different positions. N1, N2, N3, Nc represent nodes. A node group to which N1 and N2 belong is recorded as a first node group, and a node group to which N3 belongs is recorded as a second node group. Nc is a shared node between the first node group and the second node group. Among them, the first node group and the second node group are side chain node groups; or the first node group is the main chain node group, and the second node group is the side chain node group; or the first node group is the side chain node group, and the second node group is the main chain node group.

When a user terminal at a location L1 sends a transaction request, the transaction request is allocated to the N1 node closest to the location L1. The N1 node belongs to the first node group. The first node group corresponds to the first blockchain. The first node group verifies the transaction, and if the transaction is verified, the first node group newly generates a first transaction block in the first blockchain.

When the user terminal at a location L2 sends a transaction request, the transaction request is allocated to the N2 node closest to the location L2. The N2 node belongs to the first node group. The first node group verifies the transaction, and if the transaction is verified, the first node group newly generates a second transaction block in the first blockchain.

When the user terminal at a location L3 sends a transaction request, the transaction request is allocated to the N3 node closest to the location L3. The N3 node belongs to the second node group. The second node group corresponds to the second blockchain. The second node group verifies the transaction, and if the transaction is verified, the second node group generates a third transaction block (a new block) in the second blockchain. The Nc node is a common edge computing node in the first node group and the second node group. When the user terminal performs transactions on the first blockchain, the Nc node can obtain the ledger information of the user terminal. When the user terminal performs transactions on the second blockchain, the second node group can obtain the ledger information of the user terminal from the Nc node.

Figure 5:
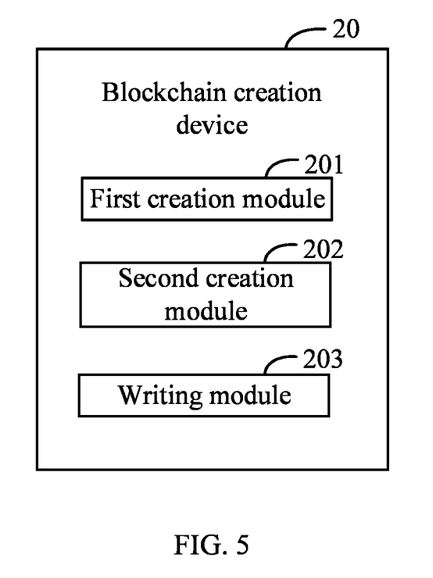
FIG. 5 shows a schematic structural diagram of a blockchain creation device provided in an embodiment of the present disclosure.

FIG. 5 shows an embodiment of a blockchain creation device.

In some embodiments, the blockchain creation device 20 runs in a computing device. The blockchain creation device 20 can include a plurality of function modules consisting of program code segments. The program code of each program code segments in the blockchain creation device 20 can be stored in a memory and executed by at least one processor to perform blockchain creation (described in detail in FIG. 5).

As shown in FIG. 2, the blockchain creation device 20 can include: a first creation module 201, a second creation module 202, and a writing module 203. A module as referred to in the present disclosure refers to a series of computer-readable instruction segments that can be executed by at least one processor and that are capable of performing fixed functions, which are stored in a memory. In some embodiment, the functions of each module will be detailed.

The above-mentioned integrated unit implemented in a form of software functional modules can be stored in a non-transitory readable storage medium. The above software function modules are stored in a storage medium and includes several instructions for causing a computing device (which can be a personal computer, a dual-screen device, or a network device) or a processor to execute the method described in various embodiments in the present disclosure.

The first creation module 201 obtains a plurality of first edge computing nodes at a preset first distance from a cloud center, and creates a main chain based on the cloud center and the plurality of first edge computing nodes.

A distance value between each edge computing node and the cloud center is obtained, and edge computing nodes whose distance value is less than or equal to the preset first distance are determined as the first edge computing nodes.

For example, assuming that a preset first distance is 2 km, and an obtained distance between the cloud center and a node A is 1 km, a distance between the cloud center and a node B is 2 km, and a distance between the cloud center and a node C is 3 km, then the node A and the node B are determined to be the first edge computing nodes.

In at least one embodiment, the first creation module 201 creating a main chain based on the cloud center and the plurality of first edge computing nodes includes: generating a first genesis block through the cloud center; verifying the first genesis block through the plurality of first edge computing nodes: when a verification of the first genesis block is made, determining the first genesis block as a block header of the main chain, and controlling the cloud center and the plurality of first edge computing nodes to continue generating blocks.

Creating a blockchain network based on the cloud center and the plurality of first edge computing nodes enables the cloud center and the first edge computing nodes to communicate with each other. The blockchain (including the main chain) is created of a plurality of connected blocks. Each block records transactions over a period of time. The blocks can be regarded as pages in an account book. The first block to be created is called the genesis block and has an unique identification (ID). Except for the genesis block, each subsequent block has two IDs, one is the ID of the previous block and the other is the ID of the block itself. Through the front-to-back relationship between IDs, all blocks are connected in sequence to form a blockchain.

The first genesis block includes a time-of-creation timestamp of the first genesis block, an initial block hash, and initial core parameters.

The second creation module 202 selects at least one first edge computing node from the plurality of first edge computing nodes as a shared edge computing node, and obtains a plurality of second edge computing nodes at a preset second distance from the shared edge computing node, then creates at least one side chain based on the shared edge computing node and the plurality of second edge computing nodes.

In at least one embodiment, the second creation module 202 obtaining a plurality of second edge computing nodes at a preset second distance from the shared edge computing node includes: obtaining a preset minimum number of nodes as a threshold; searching for neighboring nodes of the shared edge computing node (hereinafter referred to as first neighboring nodes), determining the shared edge computing node and the first neighboring nodes as the second edge computing nodes; calculating a number of the second edge computing nodes; when the number is less than the preset threshold number, searching for neighboring nodes of the first neighboring nodes (hereinafter referred to as second neighboring nodes); determining the second neighboring nodes as the second edge computing nodes; when the number of the second edge computing nodes is equal to the preset threshold number, ceasing to search.

The first neighboring nodes refers to nodes closest to the shared edge computing node, and the second neighboring nodes refers to nodes closest to the first neighboring nodes.

In at least one embodiment, the second creation module 202 creating at least one side chain based on the shared edge computing node and the plurality of second edge computing nodes includes: taking a block generated by the shared edge computing node as a second genesis block; verifying the second genesis block through the shared edge computing node and the plurality of second edge computing nodes; when a verification of the second genesis block is made, determining the second genesis block as a block header of the at least one side chain, and controlling the shared edge computing node and the plurality of second edge computing node to continue generating blocks.

The shared edge computing node connects the plurality of first edge computing nodes, the cloud center, and the plurality of second edge computing nodes.

In another embodiment, the main chain and the at least one side chain adopt a same consensus mechanism. The consensus mechanism includes a Delegated Proof-of-Stake (DPOS) mechanism, a Proof of Work (PoW) mechanism, etc. The consensus mechanism is used to verify a validity of a newly generated block. For example, the shared edge computing node and the plurality of second edge computing nodes are controlled to verify the second genesis block through the consensus mechanism.

The writing module 203 writes a block generated in the at least one side chain into the main chain.

In at least one embodiment, the writing module 203 writing a block generated in the at least one side chain into the main chain includes: determining whether the at least one side chain satisfies a preset condition; when the at least one side chain satisfies the preset condition, obtaining a first hash value of a last block of the at least one side chain, and obtaining a second hash value of a last block of the main chain; controlling the cloud center and the plurality of first edge computing nodes to generate a target block (a new block) on the main chain, and writing the first hash value and the second hash value into the target block, a hash value of the target block is equal to a combined value of the first hash value and the second hash value.

In at least one embodiment, wherein determining whether the at least one side chain satisfies a preset condition includes: calculating a total number of blocks generated in the at least one side chain; determining whether the total number is equal to a preset number threshold; when the total number is equal to the preset number threshold, determining that the at least one side chain satisfies the preset condition; when the total number is less than the preset number threshold, determining that the at least one side chain does not satisfy the preset condition.

In another embodiment, when the total number is greater than the preset number threshold, it is determined that the at least one side chain satisfies the preset condition.

In another embodiment, wherein determining whether the at least one side chain satisfies a preset condition includes: obtaining a first time point when the at least one side chain was written into the main chain last time, and obtaining a preset cycle and a current time point; according to the first time point and the preset cycle, determining a second time point when the at least one side chain is written to the main chain next time; when the current time point is equal to the second time point, determining that the at least one side chain satisfies the preset condition; when the current time point is not equal to the second time point, determining that the at least one side chain does not satisfy the preset conditions.

After a block generated in the at least one side chain is written into the main chain, the shared edge computing node and the plurality of second edge computing nodes are controlled to recreate a new side chain according to the main chain. This reduces the difficulty for the shared edge computing nodes and the plurality of second edge computing nodes in generating blocks in the new side chain.

The blockchain creation device 20 of the present disclosure creates a blockchain composed of a side chain and a main chain, and improves efficiency of creating a blockchain. By treating the edge computing node as a blockchain node, and through appropriate grouping and side chain control, the edge computing node in the distributed system is made into a high-performance blockchain network to ensure data synchronization and security during transmission in the distributed system.

In at least one embodiment, the blockchain creation device 20 further includes an uploading module. The uploading module is configured to receive a first transaction request sent by a user terminal at a first location; determine a first target edge computing node closest to the first location; allocate the first transaction request to a first side chain where the first target edge computing node is located, and verify a validity of the first transaction request through the first side chain. A first transaction block can be generated, and a first transaction block can be uploaded to the first side chain.

In at least one embodiment, after the first transaction block is generated, the uploading module is also configured to receive a second transaction request sent by a user terminal at a second location; determine a second target edge computing node closest to the second location; allocate the second transaction request to a second side chain where the second target edge computing node is located; determine whether the first side chain and the second side chain have a common edge computing node; when it is determined that the first side chain and the second side chain have a common edge computing node, obtain the first transaction block through the common edge computing node; generate a second transaction block through the first transaction block and upload the second transaction block to the second side chain.

The first side chain and the second side chain have the common edge computing node. When the user terminal performs the first transaction through the first side chain in the first position, the common edge computing node can obtain transaction information of the first transaction. When the user terminal performs the second transaction through the second side chain at the second location, the second side chain can obtain the transaction information of the first transaction through the common edge computing node. By using the common edge computing node as a communication channel for transaction information, time consumption of transmissions of transaction information is reduced. The transaction information of the first transaction and the transaction information of the second transaction include ledger information of the user terminal.

In another embodiments, the first side chain or the second side chain can be replaced with the main chain. For example, the second side chain is replaced with the main chain. After the first transaction block is generated, the second transaction request from the user terminal at the second location is received, and the second target edge computing node closest to the second location is determined; the second transaction request is allocated to the main chain where the second target edge computing node is located. A determination is made as to whether the first side chain and the main chain have a common edge computing node, and if it is determined that the first side chain and the main chain have a common edge computing node, the first transaction block is obtained through the common edge computing node; a second transaction block is generated according to the first transaction block, and the second transaction block is uploaded to the main chain.

The embodiment also provides a non-transitory readable storage medium having computer-readable instructions stored therein. The computer-readable instructions are executed by a processor to implement the steps in the above-mentioned blockchain creation method, such as in steps in blocks 101-103 shown in FIG. 1:

In block 101, obtaining a plurality of first edge computing nodes at a preset first distance from a cloud center, and creating a main chain based on the cloud center and the plurality of first edge computing nodes;

In block 102, selecting at least one first edge computing node from the plurality of first edge computing nodes as a shared edge computing node, and obtaining a plurality of second edge computing nodes at a preset second distance from the shared edge computing node, then creating at least one side chain based on the shared edge computing node and the plurality of second edge computing nodes;

In block 103, writing a block generated in the at least one side chain into the main chain.

The computer-readable instructions are executed by the processor to realize the functions of each module/unit in the above-mentioned device embodiments, such as the modules 201-203 in FIG. 5:

The first creation module 201 obtains a plurality of first edge computing nodes at a preset first distance from a cloud center, and creates a main chain based on the cloud center and the plurality of first edge computing nodes;

The second creation module 202 selects at least one first edge computing node from the plurality of first edge computing nodes as a shared edge computing node, and obtains a plurality of second edge computing nodes at a preset second distance from the shared edge computing node, then creates at least one side chain based on the shared edge computing node and the plurality of second edge computing nodes;

The writing module 203 writes a block generated in the at least one side chain into the main chain.

Figure 6:
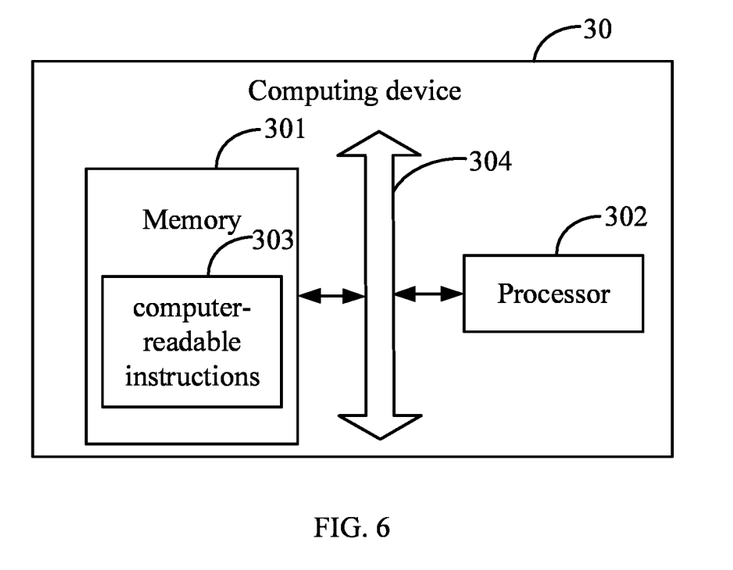
FIG. 6 shows a schematic structural diagram of a computing device provided in an embodiment of the present disclosure.

FIG. 6 is a schematic structural diagram of a computing device provided in an embodiment of the present disclosure. The computing device 30 may include: a memory 301, at least one processor 302, computer-readable instructions 303 stored in the memory 301 and executable on the at least one processor 302, for example, blockchain creation programs, and a bus 304. The processor 302 executes the computer-readable instructions to implement the steps in the embodiment of the blockchain creation method, such as in steps in block 101-103 shown in FIG. 1.

In block 101, obtaining a plurality of first edge computing nodes at a preset first distance from a cloud center, and creating a main chain based on the cloud center and the plurality of first edge computing nodes;

In block 102, selecting at least one first edge computing node from the plurality of first edge computing nodes as a shared edge computing node, and obtaining a plurality of second edge computing nodes at a preset second distance from the shared edge computing node, then creating at least one side chain based on the shared edge computing node and the plurality of second edge computing nodes;

In block 103, writing a block generated in the at least one side chain into the main chain.

Alternatively, the processor 302 executes the computer-readable instructions to implement the functions of the modules/units in the foregoing device embodiments, such as the modules 201-203 in FIG. 5.

The first creation module 201 obtains a plurality of first edge computing nodes at a preset first distance from a cloud center, and creates a main chain based on the cloud center and the plurality of first edge computing nodes;

The second creation module 202 selects at least one first edge computing node from the plurality of first edge computing nodes as a shared edge computing node, and obtains a plurality of second edge computing nodes at a preset second distance from the shared edge computing node, then creates at least one side chain based on the shared edge computing node and the plurality of second edge computing nodes;

The writing module 203 writes a block generated in the at least one side chain into the main chain.

For example, the computer-readable instructions can be divided into one or more modules/units, and the one or more modules/units are stored in the memory 301 and executed by the at least one processor 302. The one or more modules/ units can be a series of computer-readable instruction segments capable of performing specific functions, and the instruction segments are used to describe execution processes of the computer-readable instructions in the computing device 30. For example, the computer-readable instruction can be divided into the first creation module 201, the second creation module 202, and the writing module 203 as in FIG. 5.

The computing device 30 can be a computing device such as a desktop computer, a notebook, a palmtop computer, and a cloud server. Those skilled in the art will understand that the schematic diagram 3 is only an example of the computing device 30 and does not constitute a limitation on the computing device 30. Another computing device 30 may include more or fewer components than shown in the figures or may combine some components or have different components. For example, the computing device 30 may further include an input/output device, a network access device, a bus, and the like.

The at least one processor 302 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 302 can be a microprocessor or any conventional processor. The processor 302 is a control center of the computing device 30 and connects various parts of the entire computing device 30 by using various interfaces and lines.

The memory 301 can be configured to store the computer-readable instructions and/or modules/units. The processor 302 may run or execute the computer-readable instructions and/or modules/units stored in the memory 301 and may call up data stored in the memory 301 to implement various functions of the computing device 30. The memory 301 mainly includes a storage program area and a storage data area. The storage program area may store an operating, system, and an application program required for at least one function (such as a sound playback function, an image playback function, etc.), etc. The storage data area may store data (such as audio data, phone book data, etc.) created according to the use of the computing device 30. In addition, the memory 301 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the computing device 30 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed computing device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail, with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A blockchain creation method, applied in a distributed system, the distributed system comprising a cloud center and a plurality of edge computing nodes, the method comprising:
    obtaining a plurality of first edge computing nodes at a preset first distance from the cloud center, and creating a main chain based on the cloud center and the plurality of first edge computing nodes;
    selecting at least one first edge computing node from the plurality of first edge computing nodes as a shared edge computing node, and obtaining a plurality of second edge computing nodes at a preset second distance from the shared edge computing node, creating at least one side chain based on the shared edge computing node and the plurality of second edge computing nodes; and
    writing a block generated in the at least one side chain into the main chain.

2. The blockchain creation method of claim 1, wherein creating a main chain based on the cloud center and the plurality of first edge computing nodes comprises:
   generating a first genesis block through the cloud center;
   verifying the first genesis block through the plurality of first edge computing nodes; and
   when a successful verification of the first genesis block is made, determining the first genesis block as a block header of the main chain and controlling the cloud center and the plurality of first edge computing nodes to continue generating blocks.

3. The blockchain creation method of claim 1, wherein creating at least one side chain based on the shared edge computing node and the plurality of second edge computing nodes comprises:
   determining a block generated by the shared edge computing node as a second genesis block;
   verifying the second genesis block through the shared edge computing node and the plurality of second edge computing nodes; and
   when a successful verification of the second genesis block is made, determining the second genesis block as a block header of the at least one side chain and controlling the shared edge computing node and the plurality of second edge computing node to continue generating blocks.

4. The blockchain creation method of claim 1, wherein writing a block generated in the at least one side chain into the main chain comprises:
   determining whether the at least one side chain satisfies a preset condition;
   when the at least one side chain satisfies the preset condition, obtaining a first hash value of a last block of the at least one side chain, and obtaining a second hash value of a last block of the main chain;
   controlling the cloud center and the plurality of first edge computing nodes to generate a target block on the main chain; and
   writing the first hash value and the second hash value into the target block, a hash value of the target block is equal to a combined value of the first hash value and the second hash value.

5. The blockchain creation method of claim 4, wherein determining whether the at least one side chain satisfies a preset condition comprises:
   calculating a total number of blocks generated in the at least one side chain;
   determining whether the total number is equal to a preset number threshold;
   when the total number is equal to the preset number threshold, determining that the at least one side chain satisfies the preset condition; and
   when the total number is less than the preset number threshold, determining that the at least one side chain does not satisfy the preset condition.

6. The blockchain creation method of claim 1, further comprising:
   receiving a first transaction request sent by a user terminal at a first location;
   determining a first target edge computing node closest to the first location;
   allocating the first transaction request to a first side chain where the first target edge computing node is located;
   verifying a validity of the first transaction request and generating a first transaction block through the first side chain; and
   uploading the first transaction block to the first side chain.

7. The blockchain creation method of claim 6, further comprising:
   receiving a second transaction request sent by a user terminal at a second location;
   determining a second target edge computing node closest to the second location;
   allocating the second transaction request to a second side chain where the second target edge computing node is located;
   determining whether the first side chain and the second side chain have a common edge computing node;
   when it is determined that the first side chain and the second side chain have a common edge computing node, obtaining the first transaction block through the common edge computing node; and
   generating a second transaction block through the first transaction block and uploading the second transaction block to the second side chain.

8. A computing device comprising a memory and a processor, the memory stores at least one computer-readable instruction, which when executed by the processor causes the processor to:
   obtain a plurality of first edge computing nodes at a preset first distance from a cloud center, and create a main chain based on the cloud center and the plurality of first edge computing nodes;
   select at least one first edge computing node from the plurality of first edge computing nodes as a shared edge computing node, and obtain a plurality of second edge computing nodes at a preset second distance from the shared edge computing node, create at least one side chain based on the shared edge computing node and the plurality of second edge computing nodes; and
   write a block generated in the at least one side chain into the main chain.

9. The computing device of claim 8, wherein the processor creates a main chain based on the cloud center and the plurality of first edge computing nodes by:
   generating a first genesis block through the cloud center;
   verifying the first genesis block through the plurality of first edge computing nodes; and
   when a successful verification of the first genesis block is made, determining the first genesis block as a block header of the main chain and controlling the cloud center and the plurality of first edge computing nodes to continue generating blocks.

10. The computing device of claim 8, wherein the processor creates at least one side chain based on the shared edge computing node and the plurality of second edge computing nodes by:
    determining a block generated by the shared edge computing node as a second genesis block;
    verifying the second genesis block through the shared edge computing node and the plurality of second edge computing nodes; and
    when a successful verification of the second genesis block is made, determining the second genesis block as a block header of the at least one side chain and controlling the shared edge computing node and the plurality of second edge computing node to continue generating blocks.

11. The computing device of claim 8, wherein the processor writes a block generated in the at least one side chain into the main chain by:
    determining whether the at least one side chain satisfies a preset condition;

when the at least one side chain satisfies the preset condition, obtaining a first hash value of a last block of the at least one side chain, and obtaining a second hash value of a last block of the main chain;

controlling the cloud center and the plurality of first edge computing nodes to generate a target block on the main chain; and writing the first hash value and the second hash value into the target block, a hash value of the target block is equal to a combined value of the first hash value and the second hash value.

12. The computing device of claim 11, wherein the processor determines whether the at least one side chain satisfies a preset condition by:

calculating a total number of blocks generated in the at least one side chain;

determining whether the total number is equal to a preset number threshold;

when the total number is equal to the preset number threshold, determining that the at least one side chain satisfies the preset condition; and when the total number is less than the preset number threshold, determining that the at least one side chain does not satisfy the preset condition.

13. The computing device of claim 8, wherein the processor is further caused to:

receive a first transaction request sent by a user terminal at a first location;

determine a first target edge computing node closest to the first location;

allocate the first transaction request to a first side chain where the first target edge computing node is located;

verify validity of the first transaction request and generating a first transaction block through the first side chain; and upload the first transaction block to the first side chain.

14. The computing device of claim 13, wherein the processor is further caused to:

receive a second transaction request sent by a user terminal at a second location;

determine a second target edge computing node closest to the second location;

allocate the second transaction request to a second side chain where the second target edge computing node is located;

determine whether the first side chain and the second side chain have a common edge computing node;

when it is determined that the first side chain and the second side chain have a common edge computing node, obtain the first transaction block through the common edge computing node; and generate a second transaction block through the first transaction block and upload the second transaction block to the second side chain.

15. A non-transitory storage medium having stored thereon at least one computer-readable instructions that, when the at least one computer-readable instructions are executed by a processor to implement a blockchain creation method, which comprises:

obtaining a plurality of first edge computing nodes at a preset first distance from a cloud center, and creating a main chain based on the cloud center and the plurality of first edge computing nodes;

selecting at least one first edge computing node from the plurality of first edge computing nodes as a shared edge computing node, and obtaining a plurality of second edge computing nodes at a preset second distance from the shared edge computing node, creating at least one side chain based on the shared edge computing node and the plurality of second edge computing nodes; and writing a block generated in the at least one side chain into the main chain.

16. The non-transitory storage medium of claim 15, wherein creating a main chain based on the cloud center and the plurality of first edge computing nodes comprises:

generating a first genesis block through the cloud center;

verifying the first genesis block through the plurality of first edge computing nodes; and when a successful verification of the first genesis block is made, determining the first genesis block as a block header of the main chain and controlling the cloud center and the plurality of first edge computing nodes to continue generating blocks.

17. The non-transitory storage medium of claim 15, wherein creating at least one side chain based on the shared edge computing node and the plurality of second edge computing nodes comprises:

determining a block generated by the shared edge computing node as a second genesis block;

verifying the second genesis block through the shared edge computing node and the plurality of second edge computing nodes; and when a successful verification of the second genesis block is made, determining the second genesis block as a block header of the at least one side chain and controlling the shared edge computing node and the plurality of second edge computing node to continue generating blocks.

18. The non-transitory storage medium of claim 15, wherein writing a block generated in the at least one side chain into the main chain comprises:

determining whether the at least one side chain satisfies a preset condition;

when the at least one side chain satisfies the preset condition, obtaining a first hash value of a last block of the at least one side chain, and obtaining a second hash value of a last block of the main chain;

controlling the cloud center and the plurality of first edge computing nodes to generate a target block on the main chain; and writing the first hash value and the second hash value into the target block, a hash value of the target block is equal to a combined value of the first hash value and the second hash value.

19. The non-transitory storage medium of claim 18, wherein determining whether the at least one side chain satisfies a preset condition comprises:

calculating a total number of blocks generated in the at least one side chain;

determining whether the total number is equal to a preset number threshold;

when the total number is equal to the preset number threshold, determining that the at least one side chain satisfies the preset condition; and when the total number is less than the preset number threshold, determining that the at least one side chain does not satisfy the preset condition.

20. The non-transitory storage medium of claim 15, wherein the method further comprises:

receiving a first transaction request sent by a user terminal at a first location;

determining a first target edge computing node closest to the first location;

allocating the first transaction request to a first side chain where the first target edge computing node is located;

verifying a validity of the first transaction request and generating a first transaction block through the first side chain; and uploading the first transaction block to the first side chain.

\* \* \* \* \*